United States Patent

Spiess et al.

[11] Patent Number: 5,937,729
[45] Date of Patent: Aug. 17, 1999

[54] HYDRAULIC EMERGENCY CONTROL FOR TRANSMISSION RATIO-DEPENDENT VARIATION OF THE HYDRAULIC OIL PRESSURE IN THE HYDRAULIC CONICAL PULLEY AXIAL ADJUSTMENT MECHANISMS OF A CONTINUOUSLY VARIABLE TRANSMISSION

[75] Inventors: Ewald Spiess, Vaihingen/Enz; Hans Haecker, Sachsenheim; Joachim Luh, Bietigheim-Bissingen; Peter Baeuerle, Ludwigsburg, all of Germany; Riné Pelders, BT Nuland; Wilhelmus J. M. van Wijk, An Udenhout, both of Netherlands

[73] Assignee: Robert Bosch GmbH, Stuttgart, Germany

[21] Appl. No.: 08/952,341
[22] PCT Filed: May 9, 1996
[86] PCT No.: PCT/EP96/01947
  § 371 Date: Nov. 4, 1997
  § 102(e) Date: Nov. 4, 1997
[87] PCT Pub. No.: WO96/37717
  PCT Pub. Date: Nov. 28, 1996

[30] Foreign Application Priority Data

May 24, 1995 [DE] Germany ............ 195 19 162

[51] Int. Cl.$^6$ ................................................ F16H 9/00
[52] U.S. Cl. ...................... 91/517; 474/18; 474/28; 477/48
[58] Field of Search ................ 91/517; 474/12, 474/18, 28; 477/48

[56] References Cited

U.S. PATENT DOCUMENTS

| 4,400,164 | 8/1983 | Cadee .......................... 474/12 |
| 4,657,522 | 4/1987 | Miyawaki ..................... 474/12 |
| 4,861,318 | 8/1989 | Van Beek et al. ............. 474/18 |

*Primary Examiner*—F. Daniel Lopez
*Attorney, Agent, or Firm*—Michael J. Striker

[57] ABSTRACT

A hydraulic emergency control system for a continuous looped gear type continuously variable transmission (10) includes first and second hydraulic beveled conical pulley axial actuators controlling a gear ratio. A pump supplies a first piston chamber (13) of said first axial actuator via a sensor valve (20), wherein the sensor valve (20) is controlled by a flow control valve (73) connected downstream of the pump (80). The pump (80) supplies a second piston chamber (17) of the second axial actuator, with a pressure relief valve (40) limiting fluid pressure in said second piston chamber. Fluid in the second piston chamber (17) is controlled as a function of the fluid pressure in the first piston chamber (13) via a control line (52, 113).

11 Claims, 8 Drawing Sheets

Figur 2a
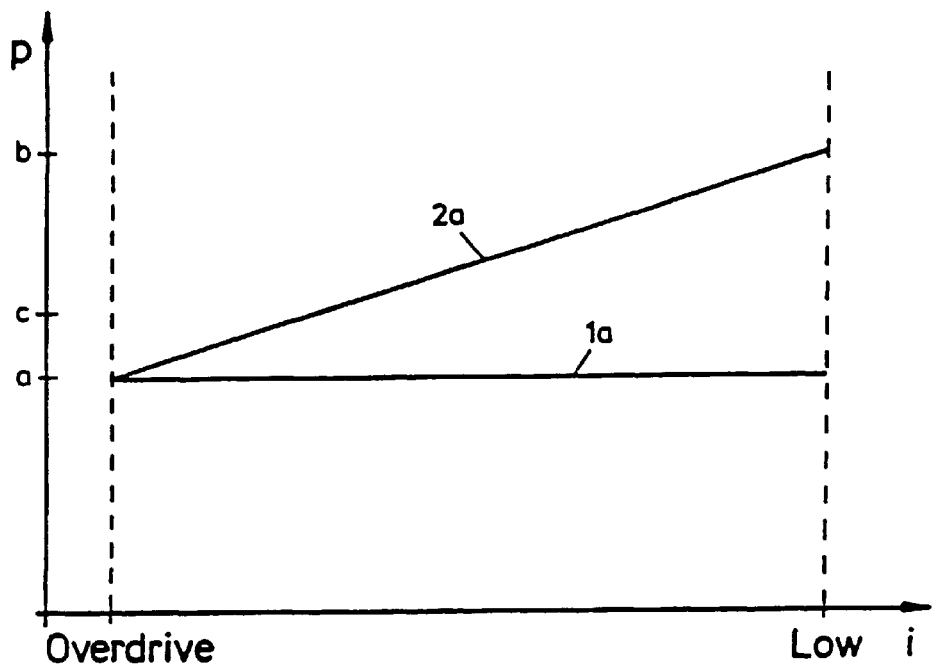
Figur 2b
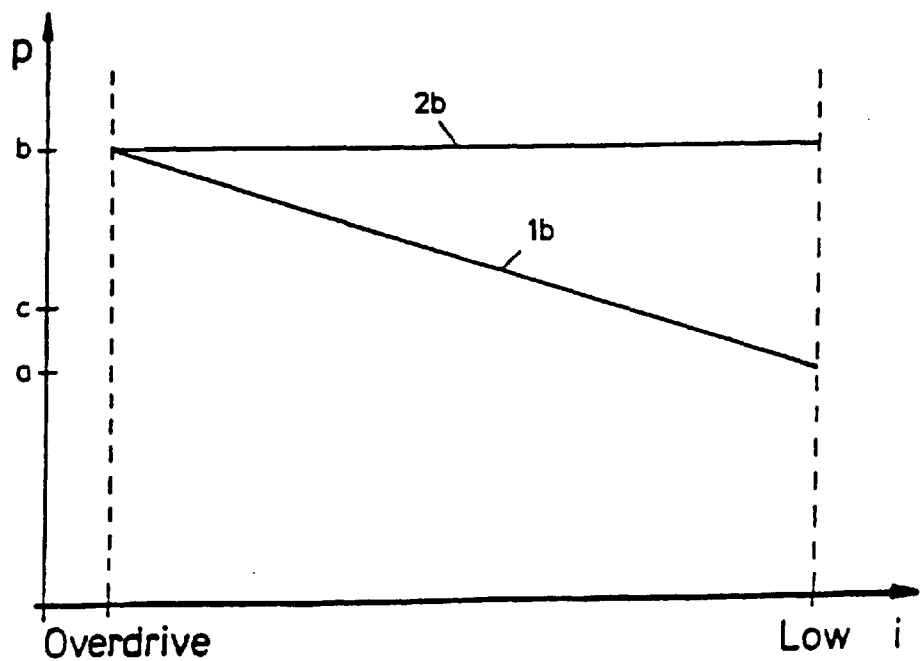

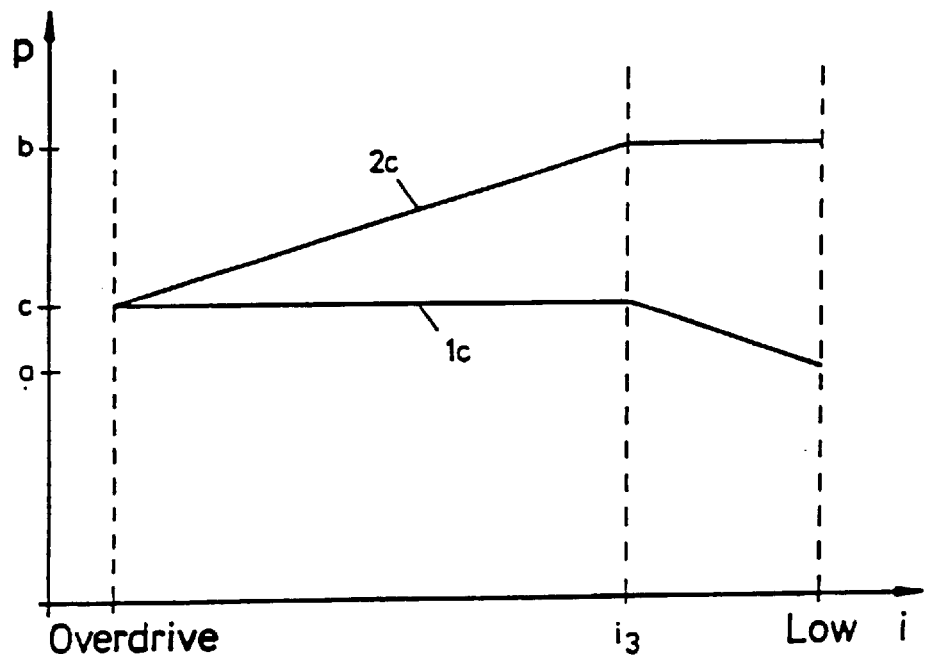
Figur 2c
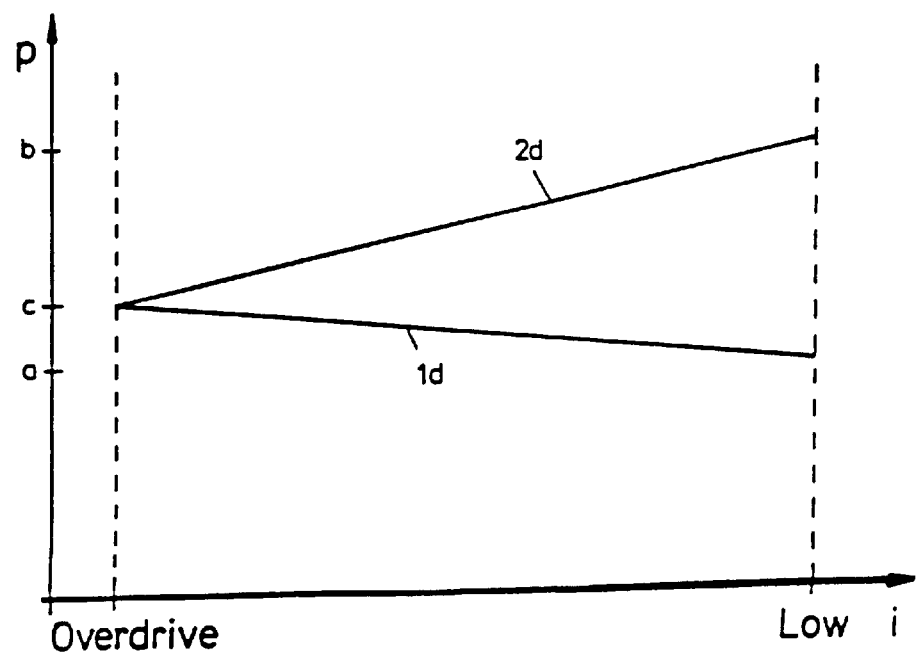
Figur 2d

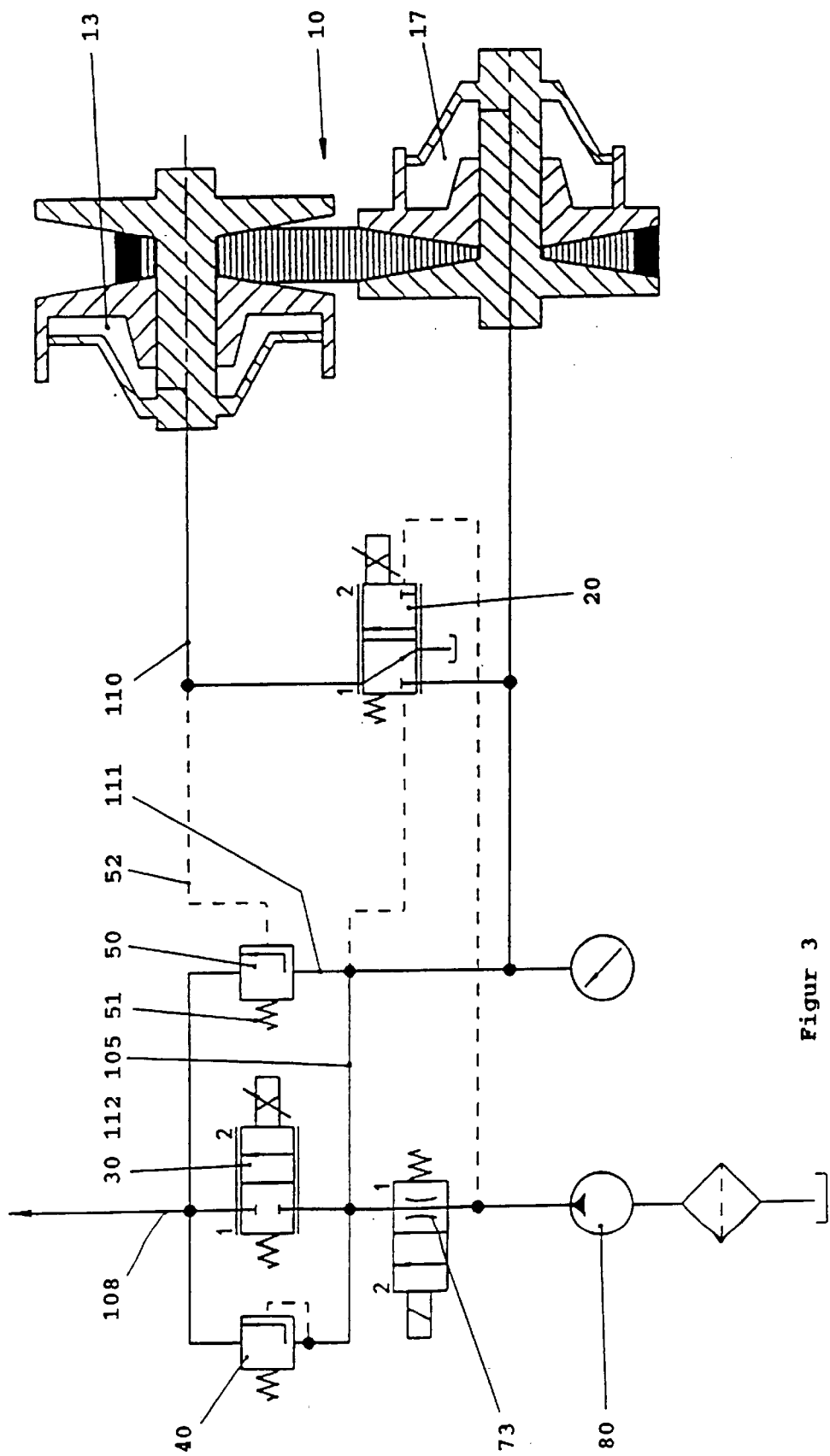
Figur 3

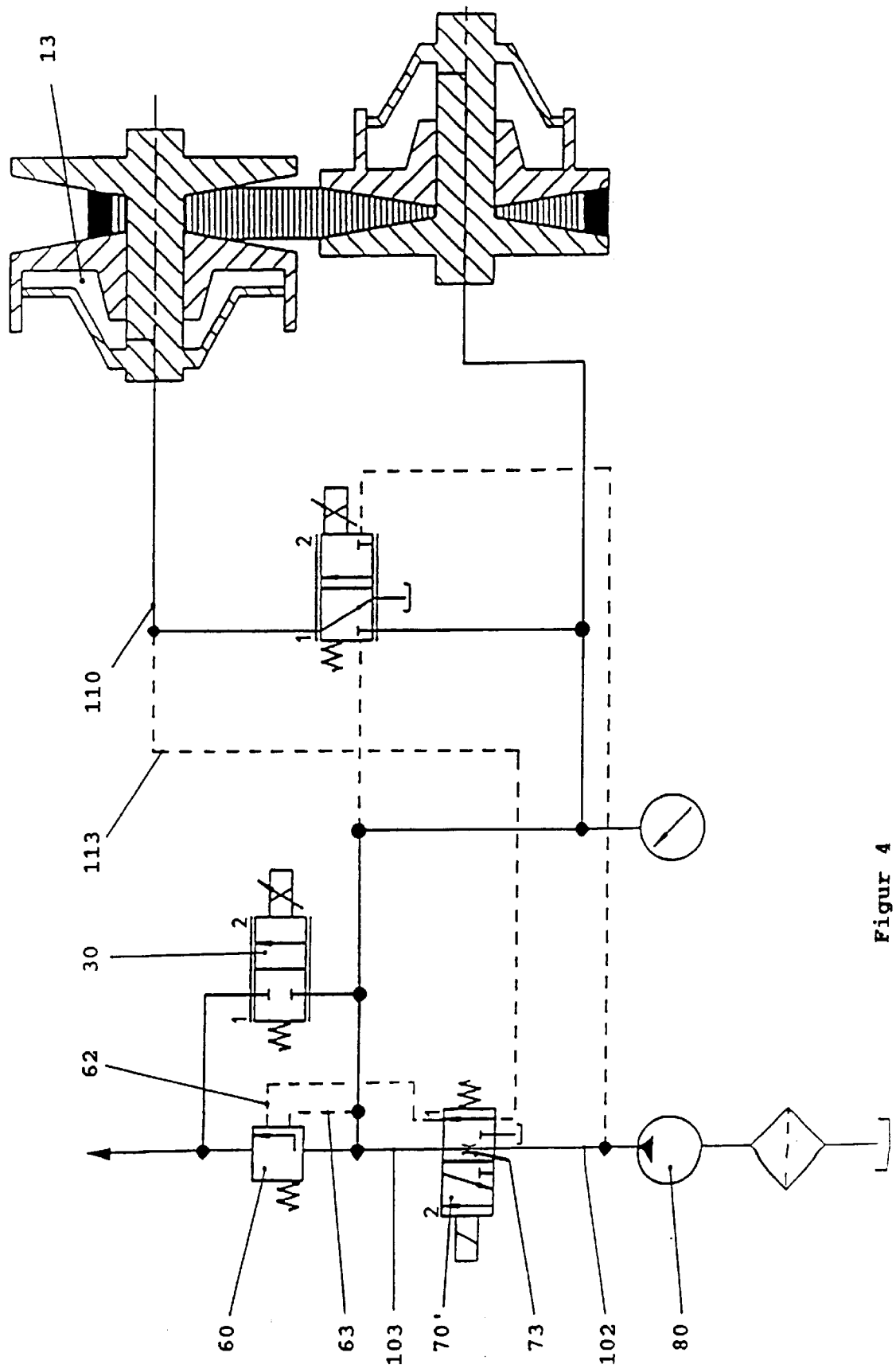
Figur 4

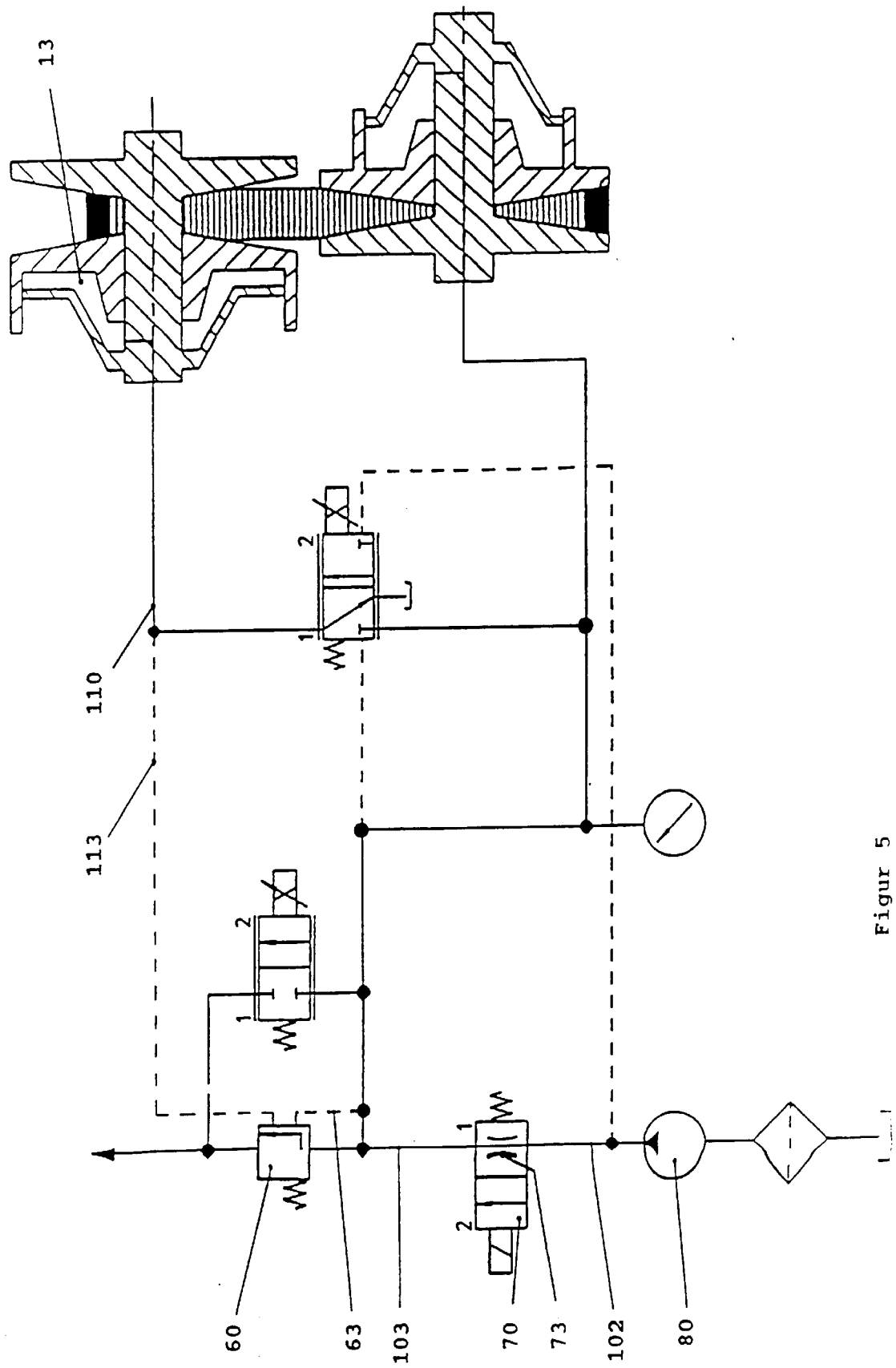
Figur 5

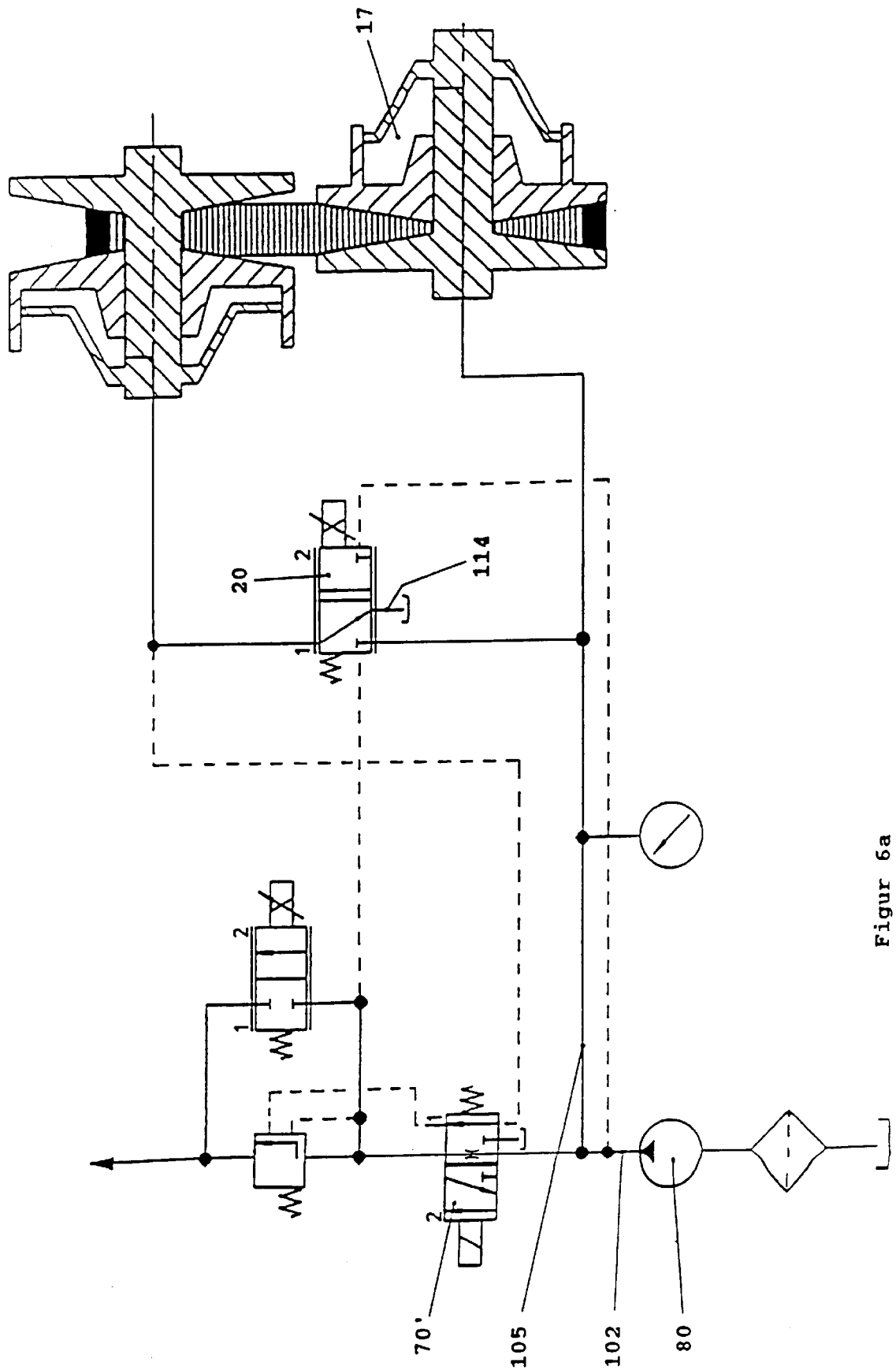

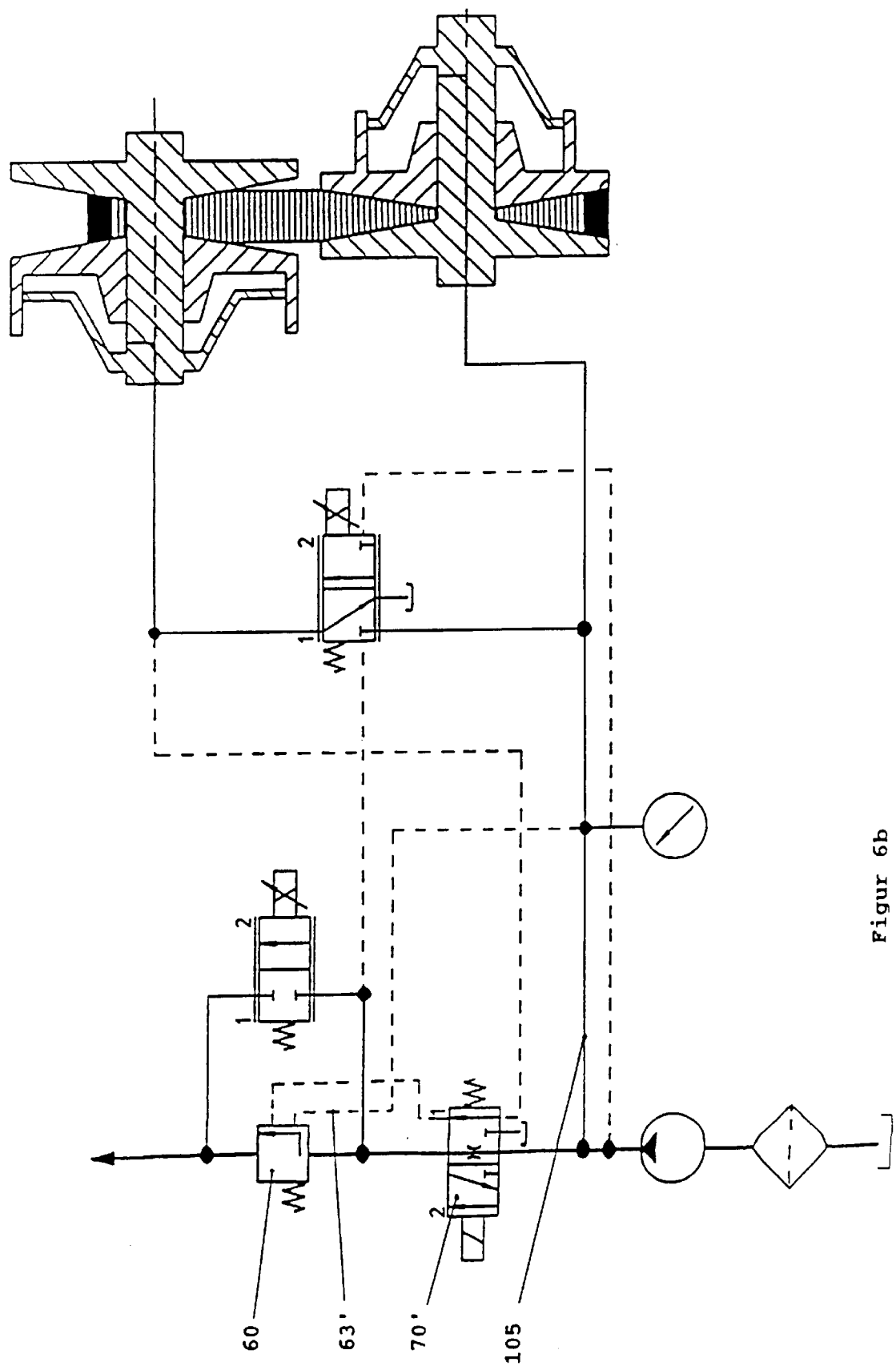
Figur 6b

HYDRAULIC EMERGENCY CONTROL FOR TRANSMISSION RATIO-DEPENDENT VARIATION OF THE HYDRAULIC OIL PRESSURE IN THE HYDRAULIC CONICAL PULLEY AXIAL ADJUSTMENT MECHANISMS OF A CONTINUOUSLY VARIABLE TRANSMISSION

PRIOR ART

A hydraulic emergency control for an electronically controlled, continuously variable transmission (continuously variable transmission, CVT) is described in not prepublished P 44 10 311.5. The CVT transmission which is preferably employed in motor vehicles, has a control for emergency driving operations which, when the electrohydraulic control of normal driving operations fails, allows a tension of the transmission means with simple hydraulic means. These means are recited in the description of FIGS. 1, 2a and 2b. For one, they allow start-up under full load without slippage of the transmission means and, for another, allow a gear change following starting from a high starting gear ratio to a lower overdrive gear ratio.

ADVANTAGES OF THE INVENTION

The hydraulic emergency control in accordance with the invention is needed in order to make possible emergency operation of a continuously transmitting looped gear without the support of an electrohydraulic actuation means that is active under normal driving conditions. In this case, the emergency control is intended to allow starting under a full load, without exceeding the permissible slippage limit of the looped gear. A gear ratio control, which is a function of the rpm, furthermore is intended to permit a gear adjustment over the entire transmission range. Here, while assuring the required transmission means tension, the hydraulic emergency control is intended to charge the hydraulic axial adjustment devices of the beveled disks with fluid pressure in such a way that known maximum fluid pressures for emergency driving operations, which are partially maintained over the entire transmission range, are lowered outside of the start-up range. The load on the hydraulic components is reduced by lowering the individual fluid pressures, and the losses as well as the wear of the transmission means is reduced by lowering the surface pressures acting on the transmission means members.

To this end, by means of the hydraulic emergency control in accordance with the invention, a fluid pressure limitation for the piston chamber of a second beveled disk axial adjustment device is employed, which is controlled as a function of the fluid pressure in the piston chamber of the axial adjustment device of a first pair of beveled disks. With the further embodiments, the second beveled disk axial adjustment device corresponds to the beveled disk axial adjustment device on the power-take off or secondary side, while the axial adjustment device of the pair of beveled disks on the powered or primary side represents the first beveled disk axial adjustment device. Another arrangement is also in principle conceivable.

For controlling the fluid pressure of the beveled disk contact pressure as a function of the gear ratio, a remote-controlled pressure regulating valve, which is actuated with the aid of the fluid pressure from the piston chamber on the drive side, is arranged parallel with an already provided pressure relief valve. This pressure regulating valve is opened when the permissible fluid pressure in the piston chamber on the drive side has been reached and lowers the fluid pressure on the power take-off side. Alternatively to this separate pressure regulating valve it is also possible to combine the pressure regulating valve and the pressure relief valve in a remote-controlled pressure relief valve. Means are provided for this which permit remote control only during emergency driving operation. These means can be an additional valve which interrupts and blocks the remote control when the electrical actuator fails. For example, it can also be a valve expansion for the valve which switches in the throttle point for picking up the rpm-dependent pressure drop in case of emergency driving operations. All valves required for emergency driving operations can be actuated electrically or hydraulically.

With longer gear ratios in particular, the hydraulic circuit in accordance with the invention creates a fluid pressure which falls on the power take-off side and slightly rises at the powered side. The latter does not exceed the permissible threshold value. On the one hand, this increases the service life of the pump and of the hydraulic components causing the axial adjustments of the beveled disks and, on the other hand, the useful life of the transmission means.

DRAWINGS

Two exemplary embodiments of the invention, besides the prior art, are schematically represented in the drawings in the form of hydraulic circuit diagrams and are described in the ensuing description, also with the aid of simplified or ideally represented diagrams. Shown are in:

FIG. 1, a hydraulic emergency control in accordance with the prior art,

FIG. 2a, a p/i-diagram of the primary and secondary fluid pressure progression during normal operation with the emergency control not activated in accordance with FIG. 1, FIG. 2b, a p/i-diagram of the primary and secondary fluid pressure progression of the emergency control in accordance with FIG. 1, FIG. 2c, a p/i-diagram of the primary and secondary fluid pressure progression of the novel emergency control in accordance with FIG. 2, FIG. 2d, a p/i-diagram of the primary and secondary fluid pressure progression of the novel emergency control in accordance with FIG. 4, FIG. 3, a hydraulic emergency control with a separate pressure regulating valve controlled by primary fluid pressure, FIG. 4, a hydraulic emergency control with a separate pressure regulating valve controlled by primary fluid pressure with disconnection of the primary pressure control line during normal operations, FIG. 5, a hydraulic emergency control with a separate pressure regulating valve controlled by primary fluid pressure, without disconnection of the primary pressure control line during normal operations, FIG. 6a, a hydraulic emergency control as in FIG. 4, with a direct connection between the pump and the piston chamber on the secondary side, FIG. 6b, a hydraulic emergency control as in FIG. 6a, with a pressure relief control over the pump pressure.

DESCRIPTION OF THE EXEMPLARY EMBODIMENTS

Figure 1:
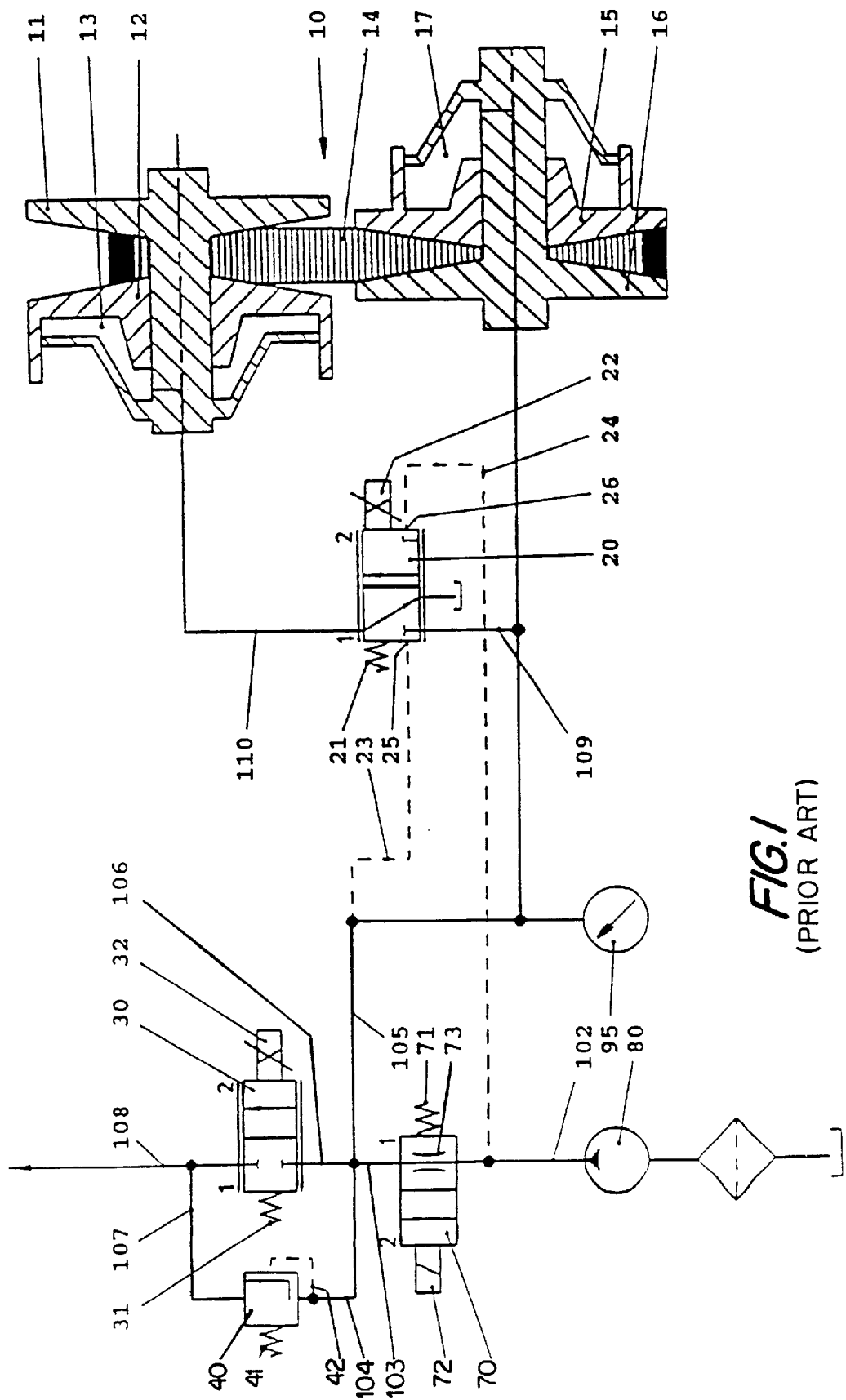

FIG. 1 shows a detail of a hydraulic circuit diagram, corresponding to the prior art, for controlling the hydraulic fluid pressures of the pressure cylinders on the drive and driven sides of a continuously transmitting looped gear. The known looped gear (10) comprises two pairs of beveled disks, between which a transfer means (14), such as a thrust link belt, chain, V-belt or the like, is disposed. Both pairs of beveled disks each comprise two beveled disks (11, 12; 15, 16), which are embodied so that they can be hydraulically braced against one another. The piston and cylinder parts required for this purpose are preferably integrated with at least some of the beveled disks. The piston chambers enclosed by these parts, the piston chamber (13) on the primary side and on the secondary side the piston chamber (17), are acted upon by the respective operating pressure in accordance with the gear ratio established.

In the embodiments described here, the requisite driven-side secondary pressure is greater than or equal to the requisite drive-side primary pressure. During normal driving operations, not shown with regard to the valve positions in FIG. 1, the piston chambers (13) and (17) are supplied with hydraulic fluid via a hydrostatic pump (80), driven by the vehicle engine, for instance. The pump (80) conveys the pressure fluid into the secondary-side piston chamber (17) via a 2/2-way valve (70), which is in the switching position 2 and is equipped with an electrical actuator (72) on the left side and with a restoring spring (71) on the right side, and a service line (105). The pressure in the service line (105) or in the piston chamber (17) is detected by means of a pressure sensor (95). To control the measured hydraulic fluid pressure, a 2/2-way sensor valve (30) with a restoring spring (31) on the left side and a controllable electrical actuator (32) on the right side is employed. The sensor valve (30) is connected via the service line (106) at the line connection between the service lines (103) and (105). In accordance with its electrically set intermediate position, which corresponds to a preselected gear operation state, the secondary fluid pressure detected by means of the pressure regulating sensor (95) is lowered to the level required for the belt tension in the transmission means (14). To this end, the hydraulic fluid conveyed by the pump (80) and not needed for the beveled disk adjustment is conducted into the service line (108) with a lower pressure level. From the service line (108), the hydraulic fluid can be available to further drive components, for example a clutch, a converter, or for lubrication.

The hydraulic fluid pressure in the piston chamber (17) is controlled, among others, as a function of the transmission ratio i ($i=n_{drive}/n_{power\ take-off}$) and of the engine torque to be transmitted, see FIG. 2a. The diagram schematically represents the hydraulic fluid progressions (1a) and (2a) on the primary and secondary sides over the transmission ratio i, for example at a maximum engine torque. The secondary fluid pressure, see characteristic curve (2a), is maximal in the starting phase at the highest transmission ratio and the greatest engine torque, here designated by "low". It drops with a dropping transmission ratio. It attains its minimum in the overdrive position of the gear.

The characteristic curve (1a) of the primary fluid pressure in the piston chamber (13) is represented below the characteristic curve (2a). The hydraulic fluid pressure there, see FIG. 1, is set by means of a 3/2-way sensor valve (20). This primary pressure regulating valve (20), which is supplied via a service line (109) from the secondary service line (105), is connected to the piston chamber (13) via a service line (110). Besides a hydraulic activation on both sides, it has a restoring spring (21) on the left side and a controllable electrical actuator (22) on the right side. The pressures in the control lines (23) and (24) adapted at the sensor valve (20) at the control connectors (25) and (26) do not affect the adjustment of this sensor valve (20), since they have the same value when the valve (70) is actuated, i.e. when the switching position set there is almost unthrottled.

If the electronic actuator fails, the valves (70) and (30) are moved by their restoring springs (71) and (31) into the switching positions 1. The hydraulic fluid conveyed by the pump (80) is first throttled by a flow control or aperture valve (73) integrated into the valve (70), and then is diverted via the service lines (105) and (104) through the pressure relief valve (40) and the service lines (107) and (108) at a low pressure level. In the control lines (23) and (24) connected upstream and downstream of the flow control valve (73), the pressure gradient present there is carried onward to the control inlets (25) and (26) of the primary pressure regulating valve (20). The precondition here is that the quantity pumped by the pump (80) varies as a function of the rpm, at least in the rpm range relevant for the gear ratio adjustment. The flow control valve (73), the operative surface areas of the slide in the valve (20) in the region of the control inlets (25) and (26), and the restoring spring (21) are all adapted to one another in such a way that, at the engine rpm intended for the beveled disk adjustment, the valve (20) is approximately in its middle closing position. If the engine rpm rise further, as a consequence of the greater pressure drop at the flow control valve (73), the valve (20) increasingly opens, and as a result hydraulic fluid flows from the service line (109) into the piston chamber (13) via the primary-side service line (110). The gear ratio i consequently drops in the direction of "overdrive", until the engine rpm have again reached the set-point rpm intended for the emergency operation mode.

As the engine rpm drop, the slide of the valve (20) moves in the direction of switching position 1, as a result of which the hydraulic fluid can flow out of the piston chamber (13) into the reservoir. In this case, the gear ratio i increases in the direction of "low". Consequently the engine rpm rise again.

In this way, the gear ratio can be adjusted from "low" to "overdrive" while the engine rpm remain approximately constant.

The two fluid pressure characteristic curves (1b) and (2b) for emergency driving conditions can be seen in FIG. 2b. Over the entire transmission range, the secondary fluid pressure, see characteristic curve (2b), is at a high pressure level "b", which is set by means of the pressure relief valve (40). The primary fluid pressure, see characteristic curve (1b), however, rises after start-up from a minimal pressure "a" to the maximal pressure "b" when reaching the overdrive range.

In general, in connection with looped gears laid out for normal driving operations in accordance with the fluid pressure progression in FIG. 2a, such fluid pressure progressions lead to considerable loss of useful time. As a rule, the hydraulic pumps are designed for such gears in such a way that they only need to resist the maximum fluid pressure "b" for a short time during the starting phase. Accordingly, keeping the fluid pressure "b" high longer, lowers the service life of the pump (80). Furthermore, the piston and cylinder elements used for the axial adjustment of the primary-side beveled disk pair (11, 12) are preferably designed for a fluid pressure "c", see FIG. 2a, which, based on a safety factor, lies above the required fluid pressure "a". However, during emergency driving operations the primary fluid pressure in the known emergency control considerably exceeds the value "c", see characteristic curve (1b) in FIG. 2b, in particular during long transmissions in the direction "overdrive". The high extended pressure values inevitably result in damage to the primary-side hydraulic axial actuator. It is known that the primary- and secondary-side fluid pressures can only be prevented by lowering the torque to be transmitted by the gear.

To prevent the mentioned problems, the hydraulic fluid pressures are lowered during emergency driving operations with the aid of the hydraulic emergency controls represented in FIGS. 3 and 4, or they are at least kept to a permissible level.

To this end, in the hydraulic circuit diagram represented in FIG. 3, a remote-controlled pressure regulating valve (50) is connected parallel with the 2/2-way sensor valve (30). The pressure regulating valve (50), which has a restoring spring (51) on the left and is connected on the right via a control line (52) to the service line (110), controls via the service lines (111) and (112), besides the pressure relief valve (40), the relief of the secondary service line (105) into the service line (108).

During normal driving operations, the pressure regulating valve (50) has no effect on the secondary fluid pressure since, among others, at a low primary fluid pressure, see FIG. 2a, characteristic line 1a, the pressure regulating valve (50) is closed by means of the restoring spring (51). However, during emergency driving operations it opens as soon as the primary fluid pressure has exceeded a threshold value which, in accordance with FIG. 2c, is identified as pressure level "c", and during which a transmission ratio $i_3$ occurs. The characteristic lines for the two hydraulic fluid pressures, represented in an idealized fashion, then have a progression as shown here, for example. The secondary fluid pressure, see characteristic line (2c), is initially limited during start-up to the fluid pressure "b" by the pressure relief valve. In this phase the primary fluid pressure rises, as known from FIG. 2b, among others with a dropping transmission ratio, from the fluid pressure "a" to the fluid pressure "c". Once the latter has been reached, the remote-controlled pressure regulating valve (50) opens. As a result, with continued reduction of the transmission ratio i in the direction toward "overdrive", the primary fluid pressure is maintained almost constant on the pressure level "c" as a function of the spring rate of the restoring spring (51), of the opening stroke and of the piston cross section of the pressure regulating valve (50), while the secondary fluid pressure is reduced. Accordingly, the pump (80) needs to provide the maximum secondary pressure for only a short time. The piston and cylinder elements of the primary-side piston chamber (13) can also remain designed for a fluid pressure "c".

Alternatively to this, a hydraulic circuit is represented in FIG. 4, wherein the functions of the pressure relief valve (40) and the pressure regulating valve (50) of FIG. 3 are taken over during emergency driving operations by a remote-controlled pressure relief valve (60), among others. The valve (60), which in the circuit diagram takes over the position of the valve (40) in FIG. 3, is additionally remotely controlled via the control line (62). The control line (62), which is connected next to the regular control line (63), receives its control pressure via the control line (113) from the service line (110) or the primary piston chamber (13). A 5/2-way valve (70') is arranged between the control lines (113) and (62) and replaces the valve (70) of FIGS. 1 and 3. As an additional function, in the switching position 1 during emergency driving operations it releases the control lines (113) and (62) for the remote control of the pressure relief valve (60). During normal driving operations, the valve (70') takes up the switching position 2, wherein the remote control of the valve (60) is omitted, the control line (113) is closed and the control line (62) is relieved into the reservoir. A 4/2-way valve can also be used for the valve (70'), which in the switching position 1 connects the control lines (113) and (62) and disconnects them in the switching position 2 and closes them separately. The emergency control has the effect represented in FIG. 2d on the primary- and secondary-side fluid pressure progression.

There is also the further option to combine the valves (60) and (30) into an electrically actuable sensor valve, which then takes over the function of both valves.

The hydraulic circuit diagram in accordance with FIG. 5 represents an additional variant of FIG. 4. There, the control line (113) on the primary side is directly connected with the pressure relief valve (60), i.e. the primary pressure is applied to the valve (60) during normal driving operations as well as during emergency driving operations.

Respectively one hydraulic circuit can be seen in FIGS. 6a and 6b, wherein the secondary service line (105) branches off from the service line (102) upstream of the valve (70'). In this variant it is possible to arrange the pump (80) in the immediate vicinity of the secondary-side piston chamber (17). This reduces the structural size of the construction and reduces line losses between the two components. In addition, a flow control or aperture valve can be connected in the return line (114). The throttling effect, which is only needed during emergency driving operations, can also be generated by a stroke limitation for the slide of the valve (20).

In the hydraulic circuit diagram in FIG. 6b the control line (63') for the remote control of the pressure relief valve (60) is directly connected to the service line (105). The pump pressure is directly used for remote control by this. This was shown to be advantageous at higher driving speeds in the overdrive range or with large volume flows.

We claim:

1. A hydraulic emergency control for a transmission-dependent change of hydraulic fluid pressures in a first and second hydraulic beveled disk axial actuator of a continuous looped gear (10), wherein a pump (80) supplies a second piston chamber (17) of said second axial actuator, with a pressure relief valve (40) limiting fluid pressure in said second piston chamber, and supplies a first piston chamber (13) of said first axial actuator via a sensor valve (20), wherein the sensor valve (20) is controlled by a flow control valve (73) connected downstream of the pump (80), characterized in that fluid in the second piston chamber (17) is controlled as a function of the fluid pressure in the first piston chamber (13).

2. The hydraulic emergency control in accordance with claim 1, characterized in that a remote-controlled pressure regulating valve (50) is disposed parallel with the pressure relief valve (40) for the transmission-dependent fluid pressure control.

3. The hydraulic emergency control in accordance with claim 2, characterized in that the pressure regulating valve (50) has a spring element (51), whose spring force opposes said pressure of said second piston chamber acting on a pressure valve piston surface.

4. The hydraulic emergency control in accordance with claim 2, characterized in that the pressure regulating valve (50) opens when the fluid pressure in the first piston chamber (13) exceeds a predetermined value.

5. The hydraulic emergency control in accordance with claim 3, characterized in that the spring force of the spring element (51) of the pressure regulating valve (50) is adjustable.

6. The hydraulic emergency control in accordance with claim 5, characterized in that the characteristic spring line of the spring element (51) of the pressure regulating valve (50) is non-linear.

7. The hydraulic emergency control in accordance with claim 1, characterized in that an electrically or hydraulically actuated sensor valve (30) is arranged parallel with the pressure relief valve (40), for regulating the pressure in said second pressure chamber, during normal driving operations.

8. The hydraulic emergency control in accordance with claim 1, characterized in that said pressure relief valve (60) is remotely controlled via a first control line (62, 113) connected with the first piston chamber (13) for transmission-dependent fluid pressure control.

9. The hydraulic emergency control in accordance with claim 8, characterized in that during normal driving operations the first control line (113) is disconnected from said pressure relief valve.

10. The hydraulic emergency control in accordance with claim 8, characterized in that the flow control valve (73) is associated with (113) are separated by an electrically or hydraulically operated 5/2-way valve (70'), which during emergency driving operations connects the first control line with a second control line connected to said pressure relief valve, and connects the pump (80) with a service line (103) via the flow control valve (73) while during normal driving operations blocks the first control line (113) and connects the second control line (62) to a reservoir and directly connects the pump with the service line (103); and wherein said service line is connected to said sensor valve.

11. The hydraulic emergency control in accordance with claim 1, characterized in that the pressure relief valve (60) is additionally electrically or hydraulically actuated and that said pressure relief valve (60) controls the sensor valve (30) during normal driving operations.

* * * * *